United States Patent
Huber

[11] Patent Number: 5,903,781
[45] Date of Patent: May 11, 1999

[54] APPARATUS FOR PHOTOGRAPHICALLY RECORDING THREE-DIMENSIONAL OBJECTS

[76] Inventor: Daniel Huber, Emmersbergstr. 65, CH-8200, Schaffhausen, Switzerland

[21] Appl. No.: 09/078,973

[22] Filed: May 14, 1998

[30] Foreign Application Priority Data

May 16, 1997 [DE] Germany .................. 197 20 513

[51] Int. Cl.⁶ .................................................. G03B 17/24
[52] U.S. Cl. ...................................... 396/4; 396/5
[58] Field of Search .................... 396/4, 5, 322, 396/429

[56] References Cited

U.S. PATENT DOCUMENTS

| | | | |
|---|---|---|---|
| 2,928,734 | 3/1960 | Zampol | 396/4 |
| 3,437,022 | 4/1969 | Hamonds, Jr. | 396/5 |
| 4,302,097 | 11/1981 | Chlestil | 396/4 |
| 4,372,659 | 2/1983 | Ogawa | 396/4 |

*Primary Examiner*—David M. Gray
*Attorney, Agent, or Firm*—Tarolli, Sundheim, Covell, Tummino & Szabo

[57] ABSTRACT

The apparatus comprises a light projector emitting light rays along a central longitudinal axis and a light shaping device for creating a central symmetric geometric figure of light in a plane running perpendicular to the above mentioned central longitudinal axis. A mirror assembly having a central aperture deflects the central symmetric geometric figure of light towards the center of the aperture. In this way, a thin sheet of light is created extending perpendicular to that central axis and evenly illuminating the object. A support member holds the object in the center of the aperture and is movable along the central longitudinal axis for passing the object through the thin sheet of light. A photographic camera having an optical axis coinciding with the afore mentioned central longitudinal axis of the light projector is located behind the mirror assembly to capture the portions of the object illuminated by the thin sheet of light.

14 Claims, 3 Drawing Sheets

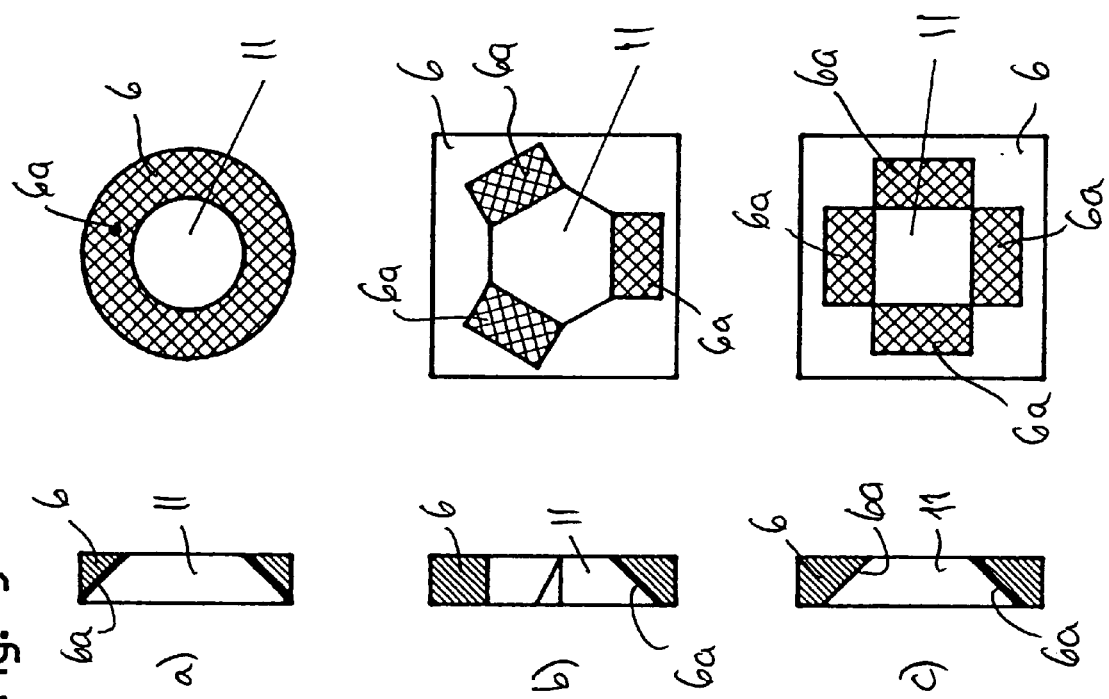
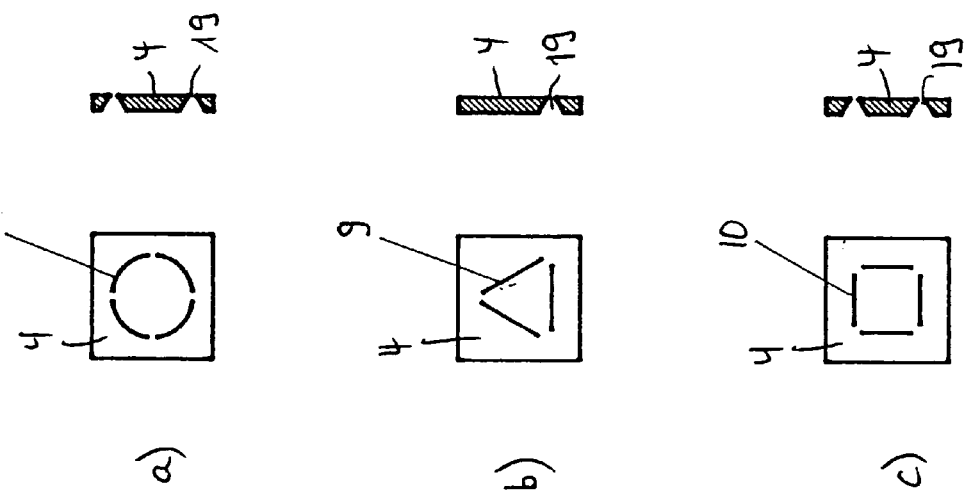

ically recording three-dimensional objects.
Particularly, the present invention refers to an apparatus by
means of which a light scanning photomacrography can be
performed to obtain either conventional photographic pic-
tures on light-sensitive photographic material or digitally
scanned and digitally recorded pictures of small specimens.

APPARATUS FOR PHOTOGRAPHICALLY RECORDING THREE-DIMENSIONAL OBJECTS

FIELD OF THE INVENTION

The present invention refers to an apparatus for photo-
graphically recording three-dimensional objects.
Particularly, the present invention refers to an apparatus by
means of which a light scanning photomacrography can be
performed to obtain either conventional photographic pic-
tures on light-sensitive photographic material or digitally
scanned and digitally recorded pictures of small specimens.

BACKGROUND OF THE INVENTION

The method of light scanning photomacrography seems to
be the only efficient method for a true color analysis of
macroscopic specimens. In this technique, an object is
moved slowly through a very thin sheet of light and is
photographed at the same time by a camera whose focal
plane is in exactly the same plane as the sheet of light. The
camera shutter is left open during the whole process.
Thereby, each portion of the object passing through the thin
sheet of light is captured sharp on the film, while the blurred
rest of the object is not illuminated and stays invisible. The
whole object is thus continuously superimposed on the
photographic film with full depth of field. The exposure is
regulated by the speed with which the object is moved
through the sheet of light. Since the sheet of light contains
all visible spectra of light, the picture will be in real color.
A further quality of light scanning pictures, besides their
remarkable sharpness, is the lack of perspective distortion;
the image is an exact axonometric representation of the
object. This is due to the fact that the object-film distance
remains constant. This phenomenon is very useful for sci-
entific measurements.

PRIOR ART

In known apparatuses for performing the above men-
tioned method of light scanning photomacrography, the thin
sheet of light is created by one or more light sources, for
example slide projectors, that are positioned perpendicularly
to the optical axis of the camera. In place of a slide, the
projectors contain a very thin slit. The slit can be made by
taping two razor blades to a slide mount. The width of the
slit has to be so small that its focused image on the specimen
is smaller than the depth of field of the camera. If more than
one projector is used, the different light beams have to be
exactly adjusted in one plane and focused on the object.

Although this method has been known for many years, it
was rarely used in scientific research. The reason may be that
besides all the definite advantages of this light scanning
technique, it also presents some problems. First, the appa-
ratuses are rather voluminous, very sensitive to vibrations,
limited to certain film formats, necessitate the use of a dark
room and they all had to be custom-made and tested.
Moreover, with conventional light scanning apparatuses,
digital image capturing was almost impossible. Mass screen-
ing of a great quantity of specimens was very time consum-
ing.

In U.S. Pat. No. 2,928,734, a method of photography is
disclosed that is useful for taking photographs, all parts of
which being in proper focus, with a camera that is so
adjusted that its depth of field is substantially less than the
dimension of the object to be photographed, measured at
right angles to the photograph. The apparatus disclosed in
that patent comprises a camera and a projector arranged
perpendicularly to the optical axis of the camera.

OBJECTS OF THE INVENTION

It is an object of the present invention to provide an
apparatus for photographically recording three-dimensional
objects in which all the problems and disadvantages of
existing light scanning apparatuses are eliminated, and to
create a small and polyvalent machine, particularly for
efficient and versatile scientific analysis of macroscopic
specimens and for broader industrial applications. A further
goal was to create a computer interface with which the
functions of the macroscope can be controlled and the digital
images can directly be acquired and processed in 3-D.

SUMMARY OF THE INVENTION

In order to achieve these and other objects and goals, the
present invention provides an apparatus for photographi-
cally recording three-dimensional objects, comprising a
light projector emitting light rays along a central longitudi-
nal axis and a light shaping device for creating a central
symmetric geometric figure of light in a plane running
perpendicular to the above mentioned central longitudinal
axis.

The apparatus further comprises a mirror assembly having
a central aperture, the center thereof being located on the
above mentioned central longitudinal axis. The mirror
assembly deflects the central symmetric geometric figure of
light towards the center of the aperture. In this way, a thin
sheet of light is created extending substantially perpendicu-
lar to that central longitudinal axis.

For holding the object to be photographically recorded in
a position located substantially in the center of the mirror
assembly, a support member is provided that is movable
along the central longitudinal axis for passing the object to
be photographically recorded through the thin sheet of light.

A photographic camera having an optical axis coinciding
with the afore mentioned central longitudinal axis of the
light projector is located behind the mirror assembly to
capture the portions of the object illuminated by the thin
sheet of light.

BRIEF DESCRIPTION OF THE DRAWINGS

FIG. 2a shows a first embodiment of a slit pattern plate
member in a plan view and a cross sectional view, respec-
tively;

FIG. 2b shows a second embodiment of a slit pattern plate
member in a plan view and a cross sectional view, respec-
tively;

FIG. 2c shows a third embodiment of a slit pattern plate
member in a plan view and a cross sectional view, respec-
tively;

FIG. 3a shows a first embodiment of a mirror assembly to
be used in conjunction with the slit pattern plate member
according to FIG. 2a in a cross sectional view and a plan
view, respectively;

FIG. 3b shows a second embodiment of a mirror assembly
to be used in conjunction with the slit pattern plate member
according to FIG. 2b in a cross sectional view and a plan
view, respectively;

FIG. 3a shows a third embodiment of a mirror assembly
to be used in conjunction with the slit pattern plate member according to FIG. 2c in a cross sectional view and a plan view, respectively;

DETAILED DESCRIPTION OF PREFERRED EMBODIMENTS

Figure 1:
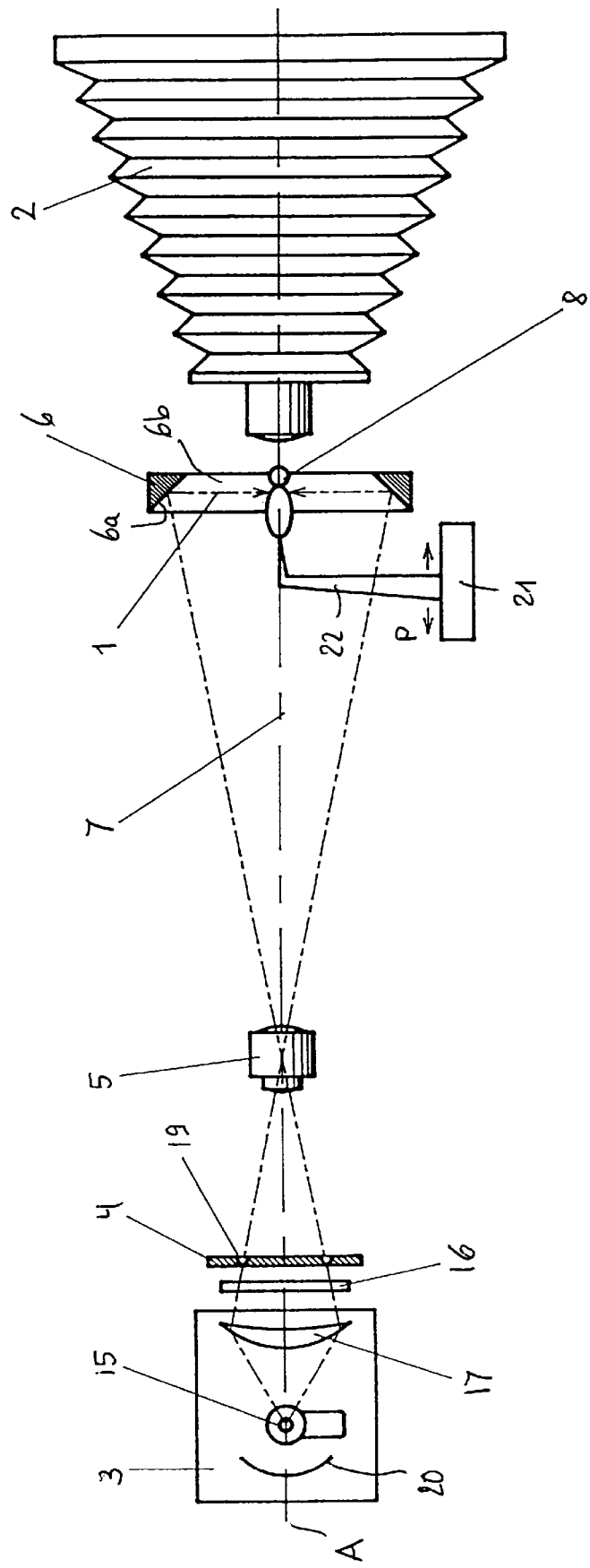
FIG. 1 shows a schematic side view of a first embodiment
of an apparatus for photographically recording three-
dimensional objects according to the present invention.

FIG. 1 shows a first embodiment of an apparatus for photographically recording three-dimensional objects in a schematic side view. The apparatus comprises a light projector assembly 3 with a light source in the form of a lamp 15. The filament of the lamp 15 is located on a central longitudinal axis A of the light projector assembly. A curved mirror 20 is positioned behind the lamp 15 to assist in directing the light rays emitted by the filament of the lamp 15 along the axis A. In front of the lamp 15, a condenser lens 17 is provided for collecting the light rays emitted by the filament of the lamp 15 and directing the collected rays along the axis A.

In front of the condenser lens 17, there is located a plate member 4 made of a non-transparent material and provided with a central symmetric slit pattern. The slit pattern may have the shape of e.g. a circle, an equilateral triangle, a square etc. Some embodiments of suitable plate members 4 will be further described herein after with reference to FIGS. 2a–2c. The symmetry center of the plate member 4 is located on the afore mentioned axis A.

Between the condenser lens 17 and the plate member 4, an optical filer 16 may be inserted, e.g. for influencing the nature of the light falling onto the plate member.

A projection lens 5 is mounted in front of the plate member 4 such that the optical axis of the lens 5 coincides with the afore mentioned axis A. The projection lens 5 creates a picture of the slit pattern provided in the plate member 4. For instance, if the plate member 4 is provided with a circular narrow slit, the projection lens 5 creates a light circle in a plane running perpendicular to the afore mentioned axis A, as will be further explained herein after.

The apparatus further comprises a mirror assembly 6 having one or more mirror surfaces 6a and a central aperture 6b. The shape, dimension and design of the mirror assembly 6, particularly as far as the mirror surfaces are concerned, depends on the design of the plate member 4, particularly on its slit pattern. As an example, if a plate member 4 is used that comprises a circular slit, an annular mirror assembly 6 is used having a mirror surface with the shape of the interior of the jacket of a truncated cone. Some embodiments of suitable mirror assemblies 6 will be further described herein after with reference to FIGS. 3a–3c. In any case, the mirror assembly is of central symmetric design, having its center located on the afore mentioned axis A.

The three-dimensional object 8 to be photographed is positioned in the center of the mirror assembly 6. For this purpose, a support member 21 is provided, having a support arm 22 at the free end of which the object 8 to be photographed is located. As indicated by the arrows P in FIG. 1, the support member can be displaced along the afore mentioned axis A back and forth to move the object 8 to be photographed through the central aperture of the mirror assembly 6.

Finally, a photographic camera, schematically shown in FIG. 1 and designated by reference numeral 2, is located behind the mirror assembly 6. Again, the optical axis 7 of the camera 2 coincides with the afore mentioned axis A. It is understood that any type of camera 2 suitable for macro or close-up photography may be used.

According to a first embodiment, a plate member 4 schematically shown in FIG. 2a and a mirror assembly 6 schematically shown in FIG. 3a can be used. The plate member 4 of FIG. 2a has an essentially circular slit 19, and the mirror assembly 6 of FIG. 3a is of generally annular design with a central aperture 11 and provided with one mirror surface 6a in the shape of the inner side of the jacket of a truncated cone or, in other words, the inner side of a funnel. The angle of inclination of that mirror surface 6a is chosen such that the light hitting the mirror surface 6a is deflected towards the center of the mirror assembly 6, as schematically indicated by dash-dotted lines in FIG. 1.

According to a second embodiment, a plate member 4 schematically shown in FIG. 2b and a mirror assembly 6 schematically shown in FIG. 3b can be used. The plate member 4 of FIG. 2b has a slit pattern 9 essentially in the shape of a equilateral triangle, and the mirror assembly 6 of FIG. 3b comprises a hexagonal central aperture 11 and is provided with three plane, inclined mirror surfaces 6a located along three edges of the hexagonal central aperture 11. Again, the angle of inclination of each of the three mirror surfaces 6a is chosen such that the light hitting the mirror surfaces 6a is deflected towards the center of the mirror assembly 6.

According to a third embodiment, a plate member 4 schematically shown in FIG. 2c and a mirror assembly 6 schematically shown in FIG. 3c can be used. The plate member 4 of FIG. 2c has a slit pattern 10 essentially in the shape of a square, and the mirror assembly 6 of FIG. 3c comprises a square central aperture 11 and is provided with four plane, inclined mirror surfaces 6a located along the four edges of the square central aperture 11. Again, the angle of inclination of each of the four mirror surfaces 6a is chosen such that the light hitting the mirror surfaces 6a is deflected towards the center of the mirror assembly 6.

It is understood that the plate member 4 can be provided with other slit patterns as long as they are central symmetric, i.e. of essentially polygonal shape. Of course, the mirror assembly cooperating with a specific plate member has to be of corresponding design.

From the schematic illustration of FIG. 1, there can be seen that the circular slit pattern 19 of the plate member 4 is illuminated from the left side of the apparatus by means of the light projector assembly 3. Without providing the mirror assembly 6, the projection lens 5 would project a picture of the slit pattern 19 onto an imaginary projection plane B shown in dashed lines in FIG. 1, i.e. a thin light circle. By the provision of the annular mirror assembly 6, the conical light beam is deflected towards the center of the mirror assembly 6 to thereby form a thin sheet of light 1 peripherally hitting the object 8 to be photographed. Preferably, the width of the slit or slits of the slit pattern 19 is small enough such that the thickness of the resulting sheet of light 1 is equal to or less than the depth of field of the lens of the camera 2. The design of the mirror assembly 6, particularly the angle of inclination of the mirror surfaces 6a, and the characteristics of the projection lens 5 are calculated such that the resulting thin sheet of light 1 extends perpendicular to the axis A and the optical axis of the camera 2, respectively. Moreover, the design, the dimensions and the mutual arrangement of the plate member 4, the projection lens 5 and the mirror assembly 6 are calculated such that peripheral light circle hitting the surface of the object 8 to be photographed is as small and sharp as possible.

The operation of the apparatus is as follows:

An object 8, mounted at the free end of the support arm 22 of the support member 21, is moved slowly through the very thin sheet of light 1 and is photographed at the same time by the camera 2 whose focal plane is in exactly the same plane as the sheet of light 1. The camera shutter is left open during the whole process. In this way, each part of the object 8 which passes through the thin sheet of light 1 is captured sharp on the film in the camera 2, while the blurred rest of the object 8 is not illuminated and stays invisible. The whole object 8 is thus continuously superimposed on the photographic film with a full depth of field. The exposure is regulated by the speed with which the object 8 is moved through the sheet of light 1. Since the sheet of light 1 contains all visible spectra of light, the picture will be in real color. A further quality of light scanning pictures, besides their remarkable sharpness, is the lack of perspective distortion; the image is an exact axonometric representation of the object. This is due to the fact that the object-film distance remains constant. This phenomenon is very useful for scientific measurements.

Figure 4:
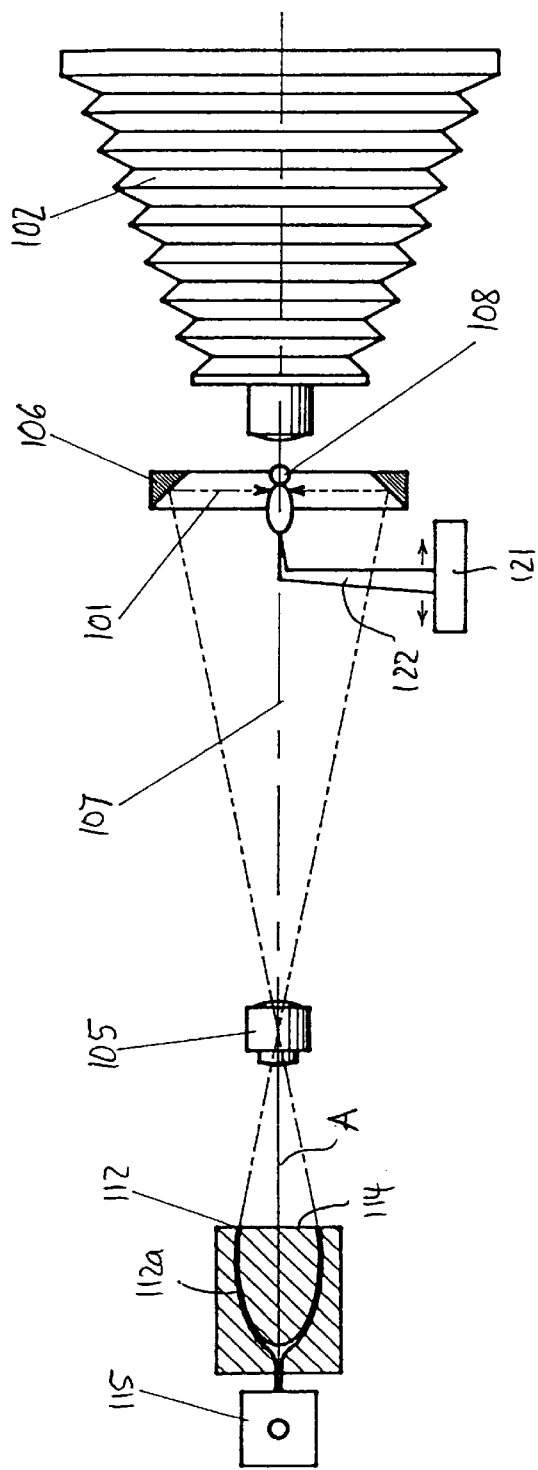
FIG. 4 shows a schematic side view of a second embodiment of an apparatus for photographically recording three-dimensional objects according to the present invention.

In FIG. 4, a second embodiment of an apparatus for photographically recording three-dimensional objects is shown in a schematic side view. The apparatus is similar to the one shown in FIG. 1 including a projection lens 105, a mirror assembly 106, a support member 121 bearing the object 108, and a camera assembly 102 having an optical axis 107. However, in this embodiment, the light projector assembly 3 and the plate member 4 of the apparatus according to FIG. 1 are replaced by a light source 115 and a light conductor assembly 112. While the left end of the light conductor assembly 112, as seen in FIG. 4, is illuminated by the light source 115, the light conductor assembly 112 is split into a plurality of light conductor branches 112a, all of them ending at a right side surface 114 of the light conductor assembly 112 in the shape of one of the above mentioned slit patterns, e.g. a circle, an equilateral triangle, a square etc., which are central symmetric with respect to the axis a of the light source 115. It is understood that in each case the mirror assembly 106 is of a design suitable for cooperating with the particular light conductor assembly 112 to create a thin sheet of light 101.

Figure 5:
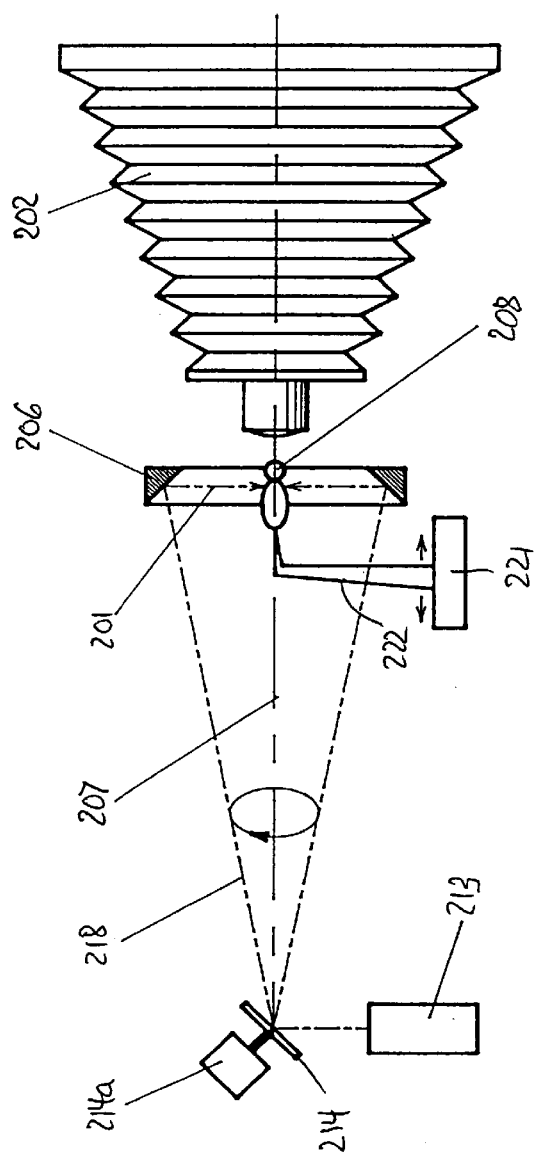
FIG. 5 shows a schematic side view of a third embodiment of an apparatus for photographically recording three-dimensional objects according to the present invention.

In FIG. 5, a third embodiment of an apparatus for photographically recording three-dimensional objects is shown in a schematic side view. The apparatus is similar to the one shown in FIG. 1 including a mirror assembly 206, a support member 221 bearing the object 208, and a camera assembly 202 having an optical axis 207. However, in this embodiment, the light projector assembly 3 and the plate member 4 of the apparatus according to FIG. 1 are replaced by a laser beam emitter 213 and a rotatable mirror 214 driven by an electric motor 214a. The mirror 214 is driven to such a movement that the laser beam 218 writes one of the above described geometric figures onto the mirror surfaces 206a of the mirror assembly 206 required for the creation of a thin sheet of light 201. If the mirror 214 is rotated with a high speed, a nearly constant sheet of light 201 is created in the central aperture of the mirror assembly 206.

From the foregoing explanations, it has become evident that all components of the apparatus are positioned along one single central axis; thus, such an apparatus can easily be erected on an optical bench. This allows a large degree of flexibility for any adaptation without any loss of stability or precision in the positioning of the components of the apparatus. The sheet of light is created by a single axially-positioned projector, which is projecting a slit pattern; for example a slit-triangle. The three projected slits are reflected by three oblique mirrors so that their beams fall together in one single plane. The width of the slits can be about 40 $\mu$m. The slit-triangle can also be replaced by other polygon slit patterns and their corresponding mirror arrangements. Unlike the currently available dual or triple light source configurations, the use of a single projector guarantees the constancy of luminosity and color balance of all the light beams. The adjustment of the different sheets of light is easy and only done once; even during transports, the light plane remains exactly adjusted.

Due to the linear arrangement the new apparatus uses very little space and can be transported easily. The camera can be a simple bellows construction; lens, bellows and film holder are exchangeable. Any known professional small-, middle- or large-format camera system (35 mm, 6×6, 4"×5") can be adapted to the new apparatus. The shutter can be computer-controlled and released electro magnetically. Depending on the focal length of the lens, the bellows extension and the film format, magnifications between 1x and 400x can be obtained.

The specimen is moved through the sheet of light with a linear stage. The linear positioning stage can be computer-controlled and can be moved with an accuracy of 1 $\mu$m.

Another possibility consists in moving the specimen step by step through the sheet of light, and capturing the image at each step with a video or digital camera. In such a case, the machine operates like a tomograph and cuts the surface of the specimen optically into thin slices. These slices can then be digitally reunited by a computer as an image stack, which then allows the 3-D reconstruction of the scanned specimen. The result is a virtual 3-D image of the specimen, on which exact morphometrical measurements can be made. The digital images can be captured and analyzed in color with a depth of 24 Bit (true color) and in black and white with a depth of 8 Bit. The digital images can be captured, processed and analyzed with a single software: NIH-Image, a free scientific image-processing software of the National Institute of Health. The preferred platform is a modern Power Macintosh with a standard video input, but there is also a PC version of this software that can be used on any Pentium PC with, a frame grabber card.

The same NIH-Image software is also used to control the scanning process of the apparatus via the serial port. Thereby, it is possible to control the scanning speed and the shutter, to capture digital images, to do the 3-D reconstruction and the morphometrical measurements with one commercially available standard computer and a single free program.

As the machine can be protected with a light-proof cover, images can even be made in a daylight environment. For many applications in science and industry the apparatus according to the invention thus offers a cheap and fast color alternative to the scanning electron microscope.

What is claimed is:

1. An apparatus for photographically recording three-dimensional objects, comprising:

a light emitting means having a central longitudinal axis along which light rays are emitted;

a light shaping means associated with said light emitting means for creating a central symmetric geometric figure of light in a plane running perpendicular to said central longitudinal axis of said light emitting means;

a light deflecting means having a central aperture, the center thereof being located on said central longitudinal axis of said light emitting means, for deflecting said central symmetric geometric figure of light towards said center of said aperture, thereby creating a thin sheet of light extending substantially perpendicular to said central longitudinal axis of said light emitting means;

an object support means for holding said object to be photographically recorded in a position located substantially in said center of said light deflecting means; and a photographic camera means having an optical axis coinciding with said central longitudinal axis of said light emitting means;

said object support means being movable along said central longitudinal axis of said light emitting means for passing said object to be photographically recorded through said thin sheet of light.

2. An apparatus according to claim 1 in which said light emitting means comprises a light projector assembly including a light source and means for directing the light emitted by said light source to radiate in a direction running substantially along said central longitudinal axis.

3. An apparatus according to claim 2 in which said means for directing the light comprises a mirror means and a condenser lens means.

4. An apparatus according to claim 2 in which said light projector assembly further comprises a filter means for controlling the characteristics of the light emitted by said light source.

5. An apparatus according to claim 1 in which said light emitting means comprises a light source and a light conductor assembly.

6. An apparatus according to claim 1 in which said light emitting means comprises a laser beam emitter.

7. An apparatus according to claim 1 in which said light shaping means comprises a plate member made of a substantially non-transparent material and having a central symmetric pattern of narrow slits.

8. An apparatus according to claim 7 in which said central symmetric pattern of narrow slits substantially has the shape of a circle.

9. An apparatus according to claim 7 in which said central symmetric pattern of narrow slits substantially has the shape of a equilateral triangle.

10. An apparatus according to claim 7 in which said central symmetric pattern of narrow slits substantially has the shape of a square.

11. An apparatus according to claim 1 in which said light shaping means comprises a light conductor assembly having a single first end facing said light emitting means and a plurality of second ends arranged in a central symmetric pattern.

12. An apparatus according to claim 1 in which said light deflecting means comprises a mirror assembly, the side walls of said central aperture of said light deflecting assembly forming a funnel shaped mirror surface.

13. An apparatus according to claim 1 in which said light deflecting means comprises a mirror assembly having at least three flat mirror surfaces evenly distributed along the periphery of said central opening in said light deflecting means, said mirror surfaces being inclined with reference to said central longitudinal axis.

14. An apparatus according to claim 1 in which said photographic camera means comprises means for electronically capturing the image of said object and for digitally storing the captured data.

* * * * *